United States Patent [19]

Vahl

[11] 3,826,100

[45] July 30, 1974

[54] METHOD AND APPARATUS FOR CONTROLLING FREEZING APPARATUS

[76] Inventor: Laszlo Vahl, Charlotte de Bourbonstraat 22, Delft, Netherlands

[22] Filed: May 19, 1972

[21] Appl. No.: 255,071

[30] Foreign Application Priority Data

May 21, 1971  Netherlands.................7106997

[52] U.S. Cl.......................... 62/63, 62/140, 62/375
[51] Int. Cl............................................ F25d 13/06
[58] Field of Search....... 62/63, 140, 374, 375, 376, 62/380

[56] References Cited
UNITED STATES PATENTS

| | | | |
|---|---|---|---|
| 3,121,999 | 2/1964 | Kasbohm et al.................. | 62/50 X |
| 3,720,072 | 3/1973 | Berta et al....................... | 62/54 |
| 3,733,847 | 5/1973 | Powell.............................. | 62/54 X |

*Primary Examiner*—Meyer Perlin
*Assistant Examiner*—Ronald C. Capossela
*Attorney, Agent, or Firm*—Sherman & Shalloway

[57] ABSTRACT

Method and apparatus for optimum recovery of an evaporating coolant in a direct contact type of freezing apparatus, such method including measuring the differential pressure in the supply or discharge duct to or from the freezing chamber and the pressure of the air in the space in which the apparatus is located resulting from the diffusion of coolant and air within the apparatus and using the pressure difference to control the discharge of air from the apparatus.

12 Claims, 2 Drawing Figures

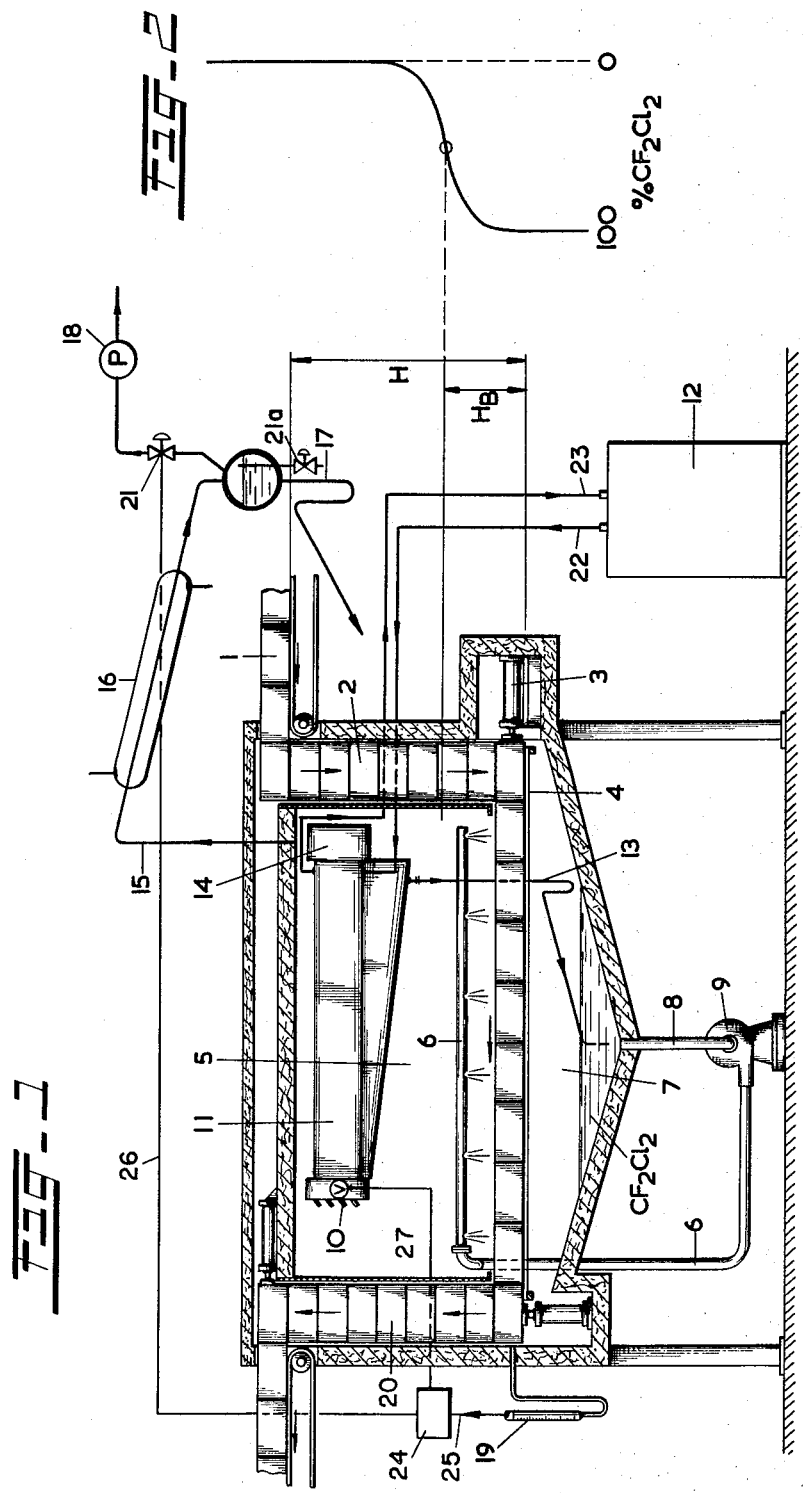

METHOD AND APPARATUS FOR CONTROLLING FREEZING APPARATUS

BACKGROUND OF THE INVENTION

1. Field of the Invention

The invention relates to a method and apparatus for controlling freezing apparatus.

2. Description of the Prior Art

Apparatus are known for freezing food and other water containing substances, wherein the removal of heat from the object to be frozen takes place by means of a medium, for example, cooled air, or by direct contact with cooled surfaces. Classified under the first category are freezing apparatus in which the heat removing medium is not gas but an evaporating liquid.

Recent attention in this area has centered on the application of liquid nitrogen as an evaporating heat removing medium as well as to the application of difluorodichloromethanol $CF_2Cl_2$, and similar coolants that evaporate in direct contact with the food in the freezing apparatus. While applying evaporating liquid nitrogen as a coolant, the gas developed during evaporation is blown into the atmosphere without being recovered (so that liquid nitrogen has to be supplied for each cycle). When applying $CF_2Cl_2$ as a coolant in the freezing apparatus, high recovery is required because of the high cost of this medium, which is much more expensive than liquid nitrogen. Recovery of the $CF_2Cl_2$ coolant takes place by condensation on surfaces cooled by cooling machines, but this method using presently available apparatus results in losses of 4 to 5 percent calculated based on the amount of frozen food.

SUMMARY OF THE PRESENT INVENTION

The present invention involves the use of freezing apparatus including a freezing chamber in which the evaporation of the coolant takes place is in open communication with the atmosphere via supply and discharge dicts. The improvement of the method and apparatus of the present invention results from using the difference between the pressure in a supply or discharge duct chamber and the ambient air pressure as a signal for the control of the removal from the freezing apparatus of a gas mixture consisting of air and coolant. A considerable part of the coolant fraction can then be recovered from this gas mixture by condensation.

The present invention is based on the understanding that a difference of pressure due to diffusion must exist between certain places in the freezing chamber and the atmosphere and that this difference of pressure at an appropriately chosen geometry of the channels communicating with the atmosphere is a function of the air contents of supply and discharge ducts, respectively, for the products to be frozen.

The invention can be used in all freezing apparatus which operate at nearly atmospheric pressure by bringing evaporating coolant into direct contact with the material to be frozen and which are in open communication with the ambient atmosphere, whereby the supply into the freezing chamber takes place downwardly and the discharge of supply from the freezing chamber takes place upwardly.

It is therefore an object of the present invention to significantly reduce losses of evaporating coolant in a freezing apparatus operating with direct contact between evaporating coolant and the products to be frozen, e.g. food or food packages, using a more or less continuous supply and discharge of the product by controlling the freezing apparatus in a convenient and economical method.

It is a further object of the present invention to significantly improve the recovery of $CF_2Cl_2$ or other relatively expensive evaporating coolants in freezing apparatus operating with direct contact between the evaporating coolant and products to be frozen using simple and inexpensive sensing and control means.

It is still a further object of the present invention to recover a significantly higher percentage of $CF_2Cl_2$ or other relatively expensive evaporating coolant than possible using currently available techniques without requiring any major changes in the presently available freezing apparatus by using a differential pressure gauge to control the amount of air in the apparatus.

The foregoing and other objects of the present invention will be described more fully in the following more detailed description of the present invention.

BRIEF DESCRIPTION OF THE DRAWINGS

FIG. 1 is a schematic view of the freezing apparatus of the present invention.

FIG. 2 is a concentration curve of coolant-air mixture within the freezing apparatus.

DESCRIPTION OF THE PREFERRED EMBODIMENTS

The environment within which the improved method and apparatus for controlling freezing apparatus were developed involves a method and apparatus for freezing foods and other water containing substances wherein the freezing method is of the type in which freezing takes place by directly contacting the food or other water containing substance with a coolant which evaporates in a freezing chamber, the food or other water containing substance to be frozen entering and leaving the freezing chamber through duct means. The freezing chamber is in open communication with the ambient atmosphere through such duct means and the freezing apparatus within the general environment of the present invention includes means for discharging air from the freezing chamber and means including a condensation chamber for recovering and recycling excess coolant and condensed evaporated coolant.

The improvement in accordance with the method of the present invention involves the steps of measuring the difference in pressure resulting from the diffusion of the coolant and air between the freezing chamber and duct means, thereby producing a control signal in response and relative to such difference in pressure and controlling the operation of the freezing apparatus in response to such control signal. In one embodiment of the present invention, the control signal is used to control the discharge of the amount of air in the freezing apparatus through the discharge means, preferably an adjustable suction pump. Alternatively, such discharge means in a downcomer filled with a cold air-coolant mixture. Still further, the control signal may in a further embodiment of the present invention operate on control means to control the rate of condensation of coolant evaporating in the freezing chamber. Such control means may be a control valve located between the freezing chamber and condensation chamber or between the condensation chamber and air discharge means.

In accordance with the present invention, the improved apparatus for freezing foods and other water containing substances includes, in addition to those means set forth in the preamble above, measuring means for measuring the difference of pressure resulting from diffusion of coolant and air between the freezing chamber and duct means so as to produce a control signal based upon such difference in pressure with control means to control the operation of the freezing apparatus in response to the control signal. Hereagain, the control means may be a control valve located between the freezing chamber and condensation chamber or between the condensation chamber and air discharge means.

The foregoing characteristics of the improved method and apparatus of the present invention will be described in more detail by reference to the attached drawings.

As shown in FIG. 1, the products to be frozen are supplied in baskets 1 with a sieve bottom with the aid of a conveyor. The baskets are piled up in a perpendicular supply duct 2. At the bottom of the duct 2 the lowest basket of the stack is pushed by means of a hydraulic cylinder 3 onto the horizontal guide surface 4 of a freezing chamber 5 and is pushed through the freezing chamber to the discharge duct 20 by the subsequent baskets. During this horizontal transport, the products to be frozen are sprayed by a liquid coolant via nozzles in supply and distributing line 6. A part of this coolant evaporates on the surface of the product to be frozen. As the coolant evaporates, it removes the necessary heat of evaporation from the material, thereby lowering the temperature to the freezing point. The evaporation temperature of the coolant, i.e. $CF_2Cl_2$, corresponding to the pressure in the freezing chamber, is almost the boiling temperature thereof ($-29°$ for $CF_2Cl_2$). The surplus of nonevaporated coolant which flows downwardly through baskets 1 and horizontal guide surface 4 with a surplus is gathered in a collector 7 and is supplied via a discharge pipe 8 to a circulation pump 9, from which it is repumped to the supply and distributing line 6. The evaporated coolant flows via a control valve 10 to a condenser 11. The control valve 10 is located between the freezing chamber 5 and the condensing chamber 11. The cooling of the condenser 11 is obtained, for example, by evaporating coolant $CHF_2Cl_2$ from a cooling apparatus 12 through supply line 22 and discharge line 23.

The amount of air entering with the product via the supply duct 2 into the freezing apparatus, plus the air penetrating by diffusion via the supply duct 2, is mixed with the evaporating medium in the freezing chamber and flows with this medium via the control valve 10 to the condenser 11. The greater part of the coolant is liquefied by cooling in the condenser 11 and flows via a discharge line 13 to the collector 7. The air with the noncondensed part of the coolant collects in a chamber 14 cooled after the condenser 11 and is guided from this point through a line 15 to an after-condenser 16 where the greater part of the coolant is condensed by cooling with a cooling liquid of a temperature of $-80°$ to $-100°$, for example, and the condensate, discharged via pipe 17, also flows to the collector 7. The air substantially freed from coolant is removed via a pump 18 or via a downcomer (not shown) operating according to the principle that cold air is heavier than the ambient air.

According to the present invention, the control of the discharge of air takes place by using the difference of pressure, measured by a differential pressure gauge 19, connected to the bottom of the supply duct 2 or the discharge duct 20 and the ambient air, as a pressure impulse-sender. The difference of pressure indicated by the gauge 19 is the result of the average composition of the mixture of air and coolant in the supply duct 2 or the discharge duct 20 and the ambient air. In each duct, the gas contents of the upper part will, during optimum conditions in the freezing apparatus, mainly consist of air and traces of coolant, whereas the gas contents of the lower part will mainly consist of the much heavier coolant with traces of air. As a result of the diffusion of the air and the coolant gas in each other somewhere in the supply duct a more or less sharp change of the gas concentration will occur (see FIG. 2 for the principal change of the concentration). There is a bending point B in the concentration change represented by the point of inflection in the concentration curve shown in FIG. 2. The difference of pressure indicated by the gauge 19 is dependent on the location of this bending point B, i.e., the height $H_B$. According to the present invention, the discharge of air from the freezing apparatus is controlled by means of the signal from gauge 19, the signal can, for example, be used to adjust the control valve 21 in such a way that the bending point of the gas concentration in the supply duct differs only in a small way from the predetermined value, e.g. 1/3 of the duct length calculated from the horizontal guide surface 4. This is reached by adjusting gauge to a value of $\Delta p = (\tfrac{2}{3}\, \rho\ \text{air} + \tfrac{1}{3}\, \rho\ CF_2Cl_2)H - \rho\ \text{air}\ H.$ wherein H represents the length of supply duct 2 or the discharge duct 20, $\rho$ air represent the density of air, and $\rho\ CF_2Cl_2$ represents the density of $CF_2Cl_2$ and $\Delta p$ represents the predetermined difference of pressure.

When the pressure gauge reads above this value of $\Delta p$, the control valve 21 is opened further, below this value it is throttled. Instead of using the control valve 21 it is, for example, also possible to obtain the same results by adjusting control valve 10 between the freezing chamber and the condenser chamber.

The signal from the gauge 19 can be applied to a controller 24 over a line 25. The controller 24 activates the control valve 21 in a conventional way through the line or link 26, or in the alternative, may operate the control valve 10 over the line or through the link 27. In the illustrated embodiment, therefore, either valve 21 may be controlled or valve 10 may be controlled. Controller 24 is illustrative of any conventional device responsive to signals from the gauge 19 to control either valve.

Having described in detail the improved method and apparatus of the present invention, it is again pointed out that through the use of such method and apparatus it is possible to control freezing apparatus in a manner not heretofore possible prior to the development of the present invention. In this regard, the employment of the improved method and apparatus of the present invention allow for the effective freezing of foods and other water containing substances by controlling the freezing apparatus in a convenient and economical manner through the employment of sensing and control means based upon a difference in pressure, the method and apparatus of the present invention allowing the employment of currently available techniques without requiring major changes in the presently available freezing apparatue. In this regard, it is possible in accordance with the present invention to significantly improve the recovery of $CF_2Cl_2$ and other relatively expensive evaporating coolants operating with direct contact between the evaporating coolant and the products to be frozen. In this respect, while the foregoing are presented basically in connection with the employment of $CF_2Cl_2$ as the coolant medium, it is obvious that any conventional coolant utilized in the type of method and apparatus described can be advantageously employed in the present invention.

Inasmuch as the present invention is subject to many variations, modifications and changes in detail, it is intended that all matter described above or shown in the accompanying drawings be interpreted as illustrative and not in a limiting sense.

What is claimed is:

1. A method for controlling apparatus for freezing water-containing substances, such as food, by contacting the substances directly with an evaporating coolant, wherein said apparatus includes a freezing chamber in which said evaporation takes place, duct means into which the substances enter and leave the freezing chamber and by which the freezing chamber is directly opened to the atmosphere, a condensation chamber for recovering and recycling excess coolant and condensed evaporated coolant, and means for discharging air cooled by the condensation chamber from the freezing chamber to the atmosphere, the improvement comprising the steps of:
   measuring the difference in pressure between the ambient atmosphere and one of the duct means due to diffusion of coolant and air in the freezing chamber;
   producing a control signal indicative of said difference in pressure; and
   controlling the operation of the freezing apparatus in response to said control signal to improve recovery of the coolant.

2. The method of claim 1 wherein said control signal is used to control the discharge, through said discharge means, of the amount of air in said freezing apparatus.

3. The method of claim 2, wherein the discharge through said discharge means is accomplished by an adjustable suction pump.

4. The method of claim 2, wherein the discharge through said discharge means is accomplished by a downcomer which is filled with a cold air-coolant mixture and allows the cold air to gravitationally escape into the ambient atmosphere.

5. The method of claim 1 wherein said control signal operates on control means for controlling the rate of condensation of coolant evaporating in said freezing chamber.

6. The method of claim 5 wherein said control means is a control valve located between said freezing chamber and said condensation chamber, said control valve opening further as said difference of pressure exceeds a predetermined value and said control valve throttling when said difference of pressure falls below said predetermined value.

7. The method of claim 5, wherein operation of said control means is accomplished by operating a control valve located between said condensation chamber and said air discharge means.

8. An apparatus for freezing water-containing substances, such as food, wherein the apparatus includes a freezing chamber in which freezing occurs by directly contacting the substances to be frozen with an evaporating coolant, duct means through which the water-containing substances enter and leave the freezing chamber and through which the freezing chamber is opened to the atmosphere, a condensation chamber for recovering and recycling excess coolant and means for discharging air cooled by said condensation chamber from the freezing chamber to the atmosphere, wherein the improvement comprises:
   means for measuring the difference in pressure between the ambient atmosphere and one of the duct means resulting from diffusion of coolant and air;
   means for producing a control signal indicative of the difference in pressure; and
   means for controlling operation of the freezing apparatus in response to said control signal to thereby improve recovery of the coolant.

9. The freezing apparatus of claim 8 wherein said discharge means is an adjustable suction pump.

10. The freezing apparatus of claim 8 wherein said discharge means is a downcomer filled with a cold air-coolant mixture.

11. The freezing apparatus of claim 8 wherein said control means is a control valve located between said freezing chamber and said condensation chamber, said control valve opening further as said difference of pressure exceeds a predetermined value and said control valve throttling when said difference of pressure falls below said predetermined value.

12. The freezing apparatus of claim 8 wherein said control means is a control valve located between said condensation chamber and said air discharge means, said control valve closing when said difference of pressure exceeds a predetermined value.

* * * * *